Figure 1:
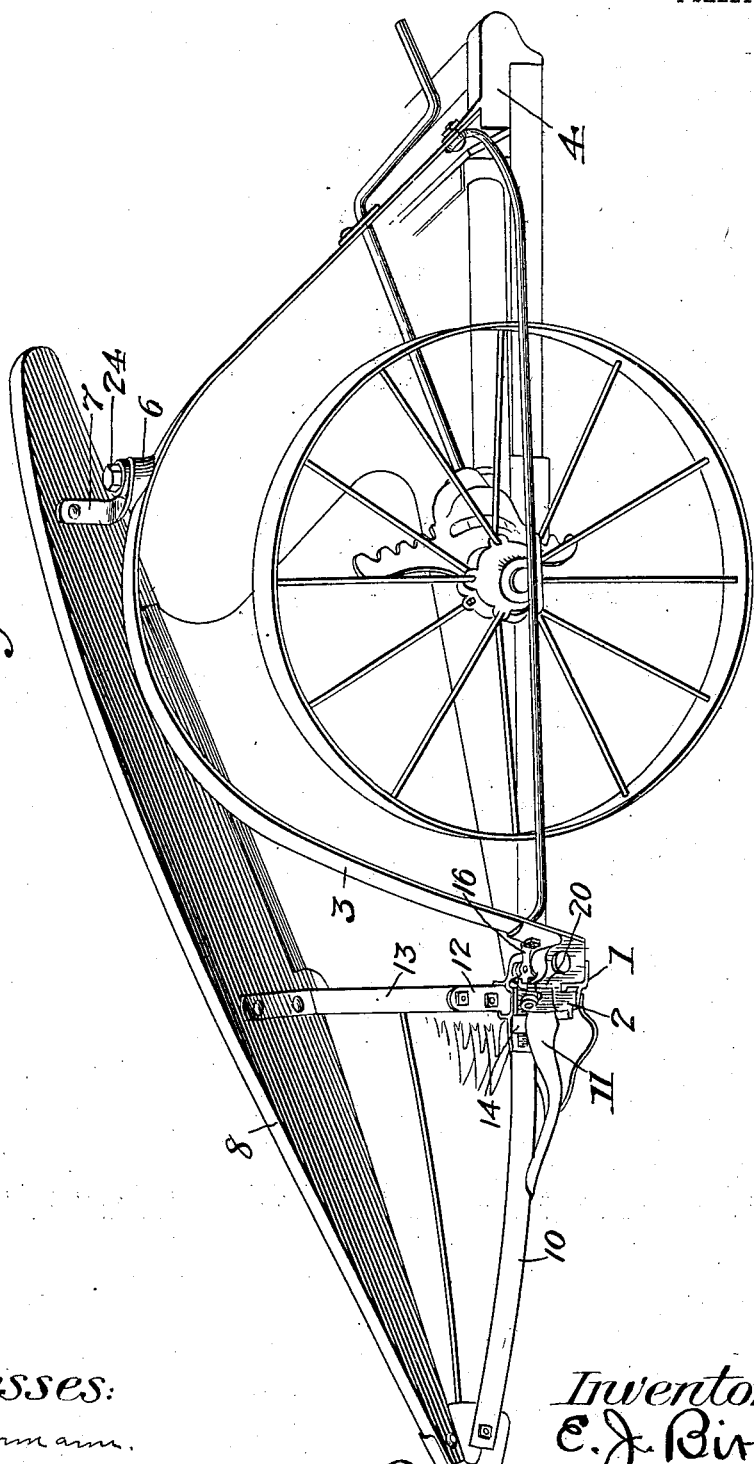

No. 727,066. PATENTED MAY 5, 1903.
E. J. BIRKETT.
DIVIDER ATTACHMENT FOR HARVESTERS.
APPLICATION FILED JAN. 5, 1903.
NO MODEL. 4 SHEETS—SHEET 1.

Witnesses:
E. C. Shuermann.
J. M. Wrenn.

Inventor:
E. J. Birkett
by Pennie T Goldsborough
his attys.

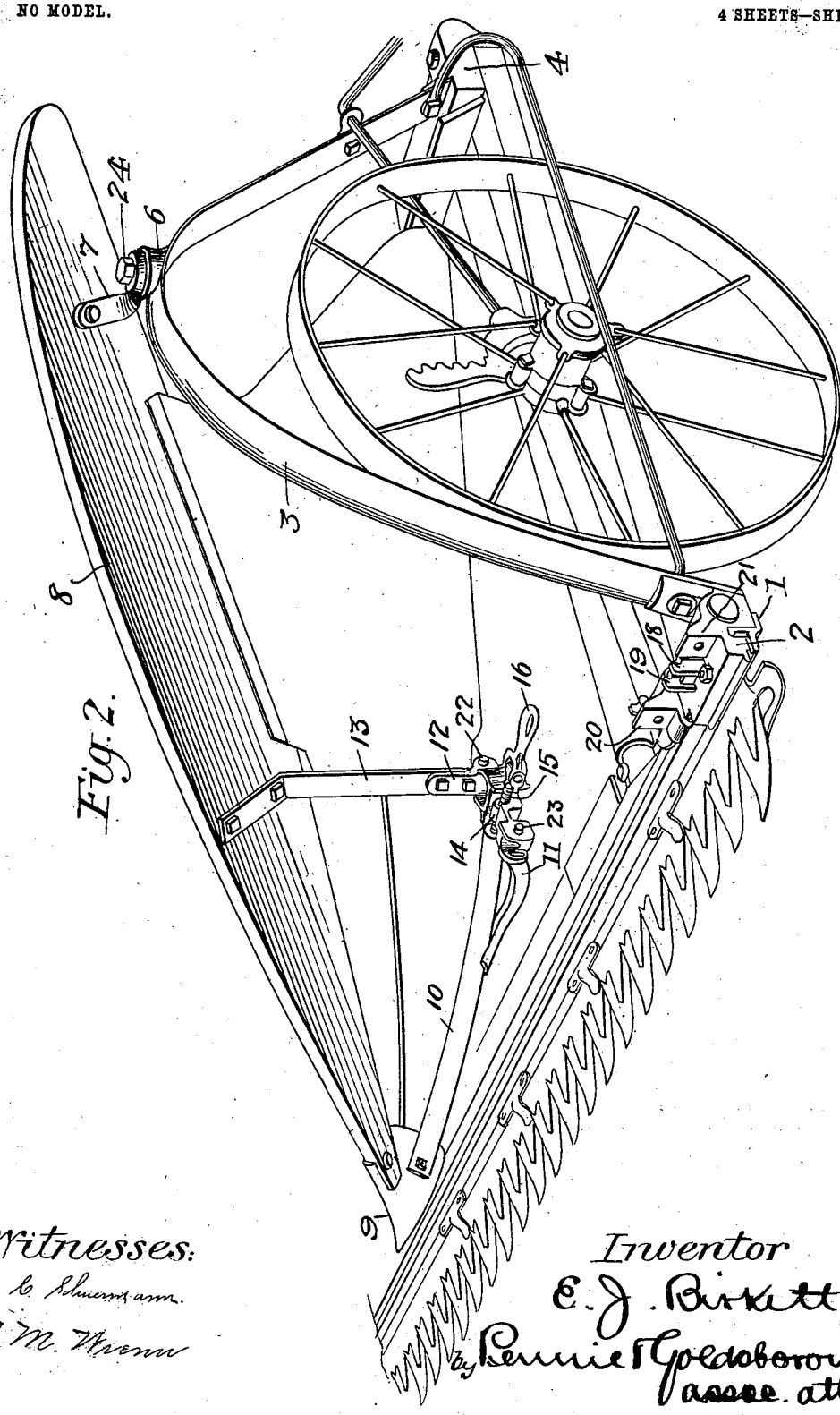

No. 727,066. PATENTED MAY 5, 1903.
E. J. BIRKETT.
DIVIDER ATTACHMENT FOR HARVESTERS.
APPLICATION FILED JAN. 5, 1903.
NO MODEL. 4 SHEETS—SHEET 3.
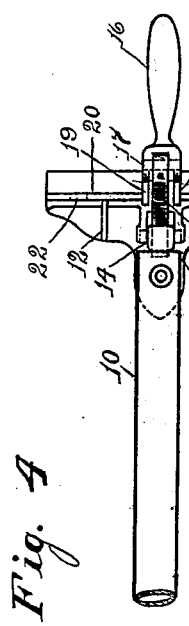
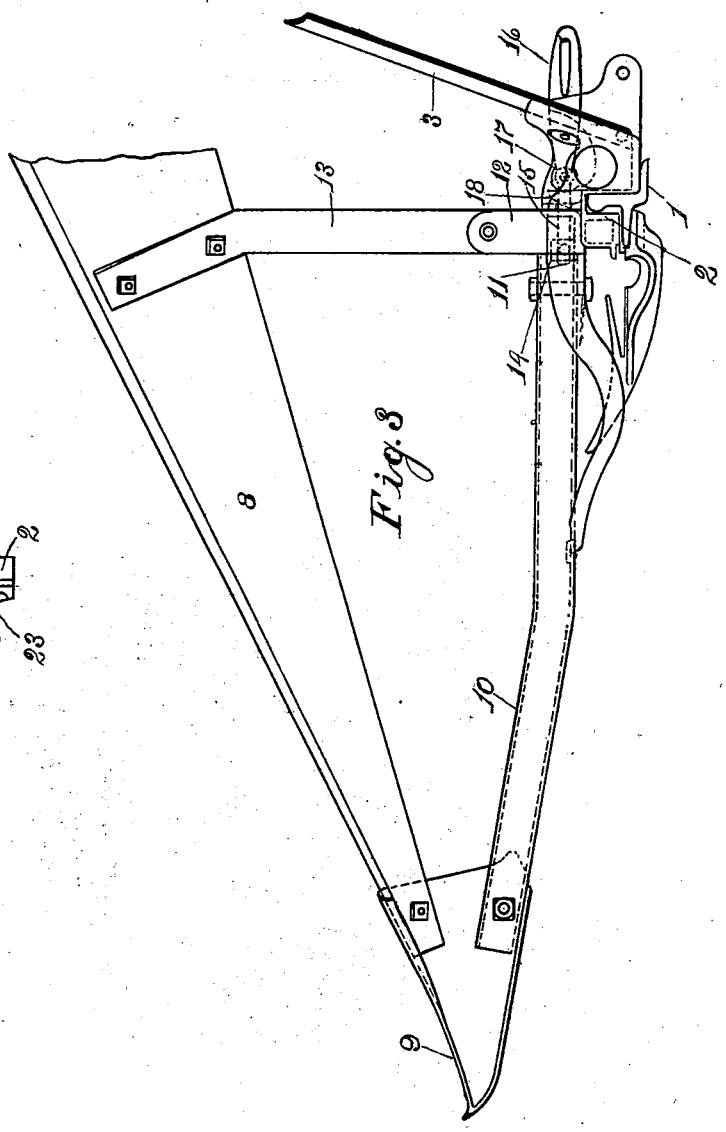
Witnesses
H. A. Krauser
B. C. Nait
Inventor
Edward J. Birkett
By his Attorney
E. W. Burgess

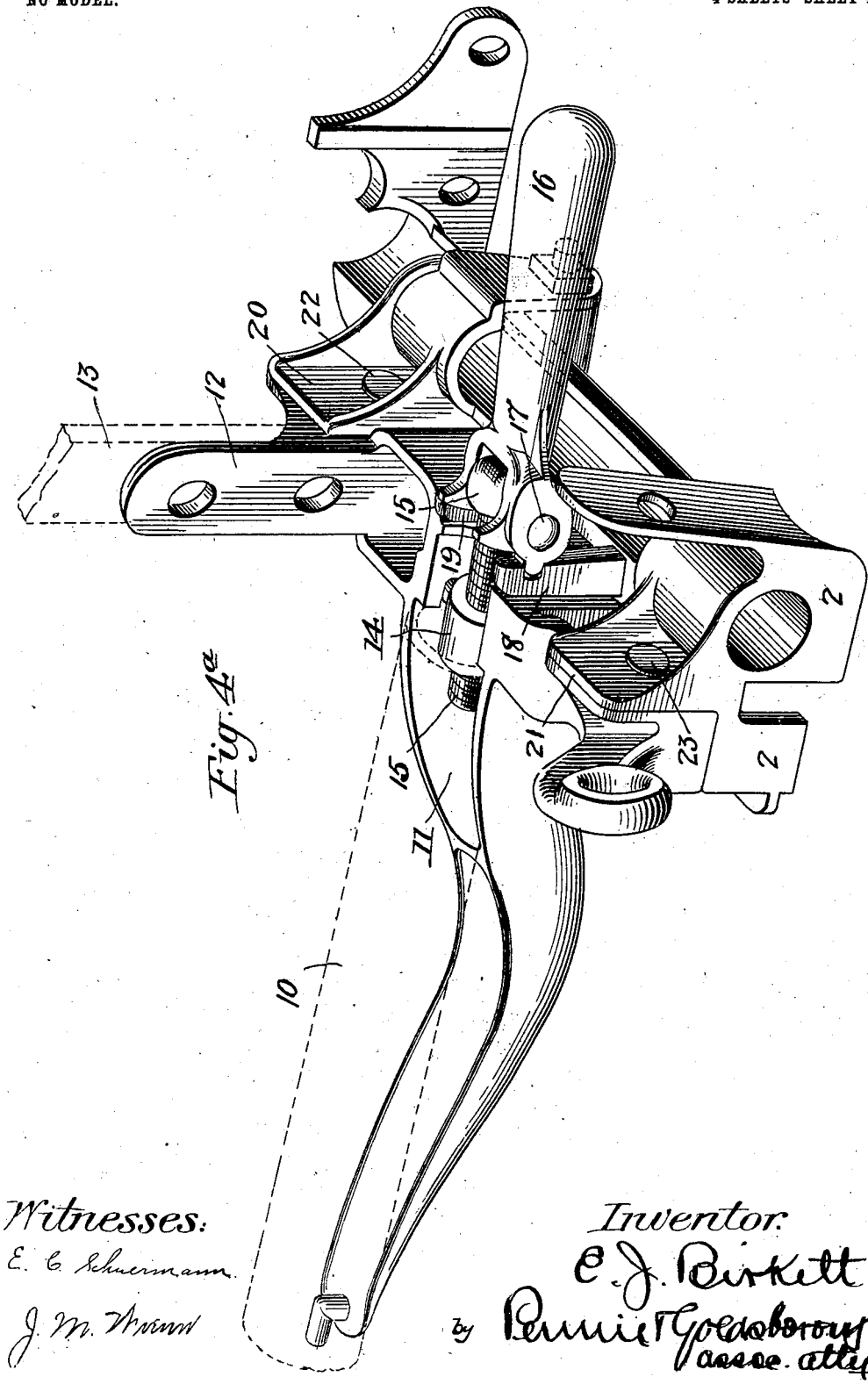

No. 727,066. Patented May 5, 1903.

UNITED STATES PATENT OFFICE.

EDWARD J. BIRKETT, OF MILWAUKEE, WISCONSIN, ASSIGNOR TO INTERNATIONAL HARVESTER CO., OF CHICAGO, ILLINOIS, A CORPORATION OF NEW JERSEY.

DIVIDER ATTACHMENT FOR HARVESTERS.

SPECIFICATION forming part of Letters Patent No. 727,066, dated May 5, 1903.

Application filed January 5, 1903. Serial No. 137,768. (No model.)

*To all whom it may concern:*

Be it known that I, EDWARD J. BIRKETT, a citizen of the United States, residing at Milwaukee, in the county of Milwaukee and State of Wisconsin, have invented certain new and useful Improvements in Divider Attachments for Harvesters, of which the following is a specification, reference being had to the accompanying drawings, forming a part thereof.

The object of my invention is to provide a divider attachment for harvesters that may be securely fastened in its operative position and also be easily and readily unfastened and swung laterally relative to the path of the machine. It is a common practice to transport machines of this class loaded upon a special design of carrying-truck, and in order to allow the machine to pass through the ordinary gateway or doorway it is usually loaded in a manner to permit its being transported with its platform extending lengthwise in the direction of travel, and in this position, if the divider attachment be left in its operative position, it not only adds to the width of the machine, but there is danger of breaking it if it be brought in contact with an obstruction. It is desirable, therefore, to so construct the attachment and the supports thereof in a manner that will allow it to be quickly swung laterally to a position in line with the length of the platform and out of the way of possible obstructions. To attain these objects is the purpose of my invention.

Reference is made to the accompanying drawings, in which like numerals represent like parts.

Figure 1 is an elevation of the grain-wheel end of a harvester-platform, showing the attachment in its operative position. Fig. 2 is a perspective view of the same end of the platform and represents the divider as swung laterally inward upon the platform and inside of the line of the cutters. Fig. 3 is an end view of the cutter-bar portion of the platform and a part of the divider attachment and is designed to show the manner in which the divider is secured to the said cutter-bar. Fig. 4 is a detail view of the clamping mechanism. Fig. 4ª is an enlarged perspective of the castings that are secured, respectively, to the platform and divider, showing also the interlocking means for fastening them together.

1 is the cutter-bar portion of the platform.

2 is a casting secured to the cutter-bar 1 and supports the forward end of the bent frame-piece 3, which is secured at its rear end to the corner-piece 4. A pivotal support 6 for a bracket 7 is secured to the divider-board 8.

9 is the divider-point, to which the forward end of the board 8 is secured.

10 is a frame-piece extending rearward from the divider-point 9 and is secured at its rear end to the part 11. The part 11 is provided with the upstanding ear 12, to which is secured the knee-brace 13, that has its upper end secured to the divider portion 8. The part 11 is also provided with bearings for a trunnion-nut 14. An adjusting-eyebolt 15 is threaded in the nut 14, and a lever 16 is hinged to the eyebolt by means of a pin 17. The part 2 is provided with upstanding ears 18 and 19, and the eyebolt 15 rests between them when the divider is in operative position. The end of the lever 16 engages with the faces of the ears 18 and 19 and holds the part 11 against the part 2. The part 2 is provided with bearing-faces 20 and 21, having cavities for the reception of pintles 22 and 23 on the part 11.

By means of the above construction I have provided an attachment that is securely held in operative position by means of the clamping mechanism and is strongly braced by the arch-piece 3 and knee-brace 13. To release the attachment and allow it to be swung laterally, the operator raises the long end of the lever 16 and frees it from contact with the ears 18 and 19. The attachment may then be moved forward enough to release the pintles 22 and 23 from the cavities in the bearing-faces 20 and 21. Then it may be swung around on the pivot-bolt 24 to a position within the line of the cutting apparatus, as shown in Fig. 2.

I am aware that it is not new to construct a divider attachment that may be adjusted laterally to vary the width of the swath to be cut; but I believe myself to be the first to provide an attachment that may be partially disconnected and then swung laterally within the line of the cutting mechanism.

What I claim, and desire to secure by Letters Patent, is—

1. In a harvester, the combination of a divider having a member extending rearward from its front end, a finger-bar, a platform-frame member secured to the finger-bar, a clamping-lever hinged to the rear end of the divider member and engaging the frame member, and a pivotal connection between the rear end of the divider and the platform-frame.

2. In a harvester, the combination of a divider having a member extending rearward from its front end, a finger-bar, a platform-frame member secured to the finger-bar, an adjustable clamping-lever hinged to the divider member, and a pivotal connection between the rear end of the divider and the platform-frame.

3. In a harvester, the combination of a finger-bar, a platform-frame, an arched bar extending from the outer end of the finger-bar to the rear outer corner of the platform-frame, a divider having a member extending rearward from its front end, a clamping-lever hinged to the divider member and adapted to clamp said member to the finger-bar, and a pivotal connection between the upper rear portion of the divider and the arched bar.

4. In a harvester, the combination of a finger-bar, a platform-frame, a divider having a member extending rearward from its front end, two interlocking parts, one of said parts being secured to the divider and the other to the platform-frame, and a clamping-lever hinged to one of said parts and adapted to engage the other, whereby the two parts are held together.

5. In a harvester, the combination of a finger-bar, a platform-frame, a divider, two meeting parts adapted to be clamped together, one of said parts being secured to the divider and the other to the platform-frame, a clamping-lever, and a threaded eyebolt hinged to said lever and provided with an adjustable nut, said nut engaging with one of the meeting parts, and the clamping-lever engaging the other, whereby the two parts are held together.

6. In a harvester, the combination of a finger-bar, a platform-frame, a divider, two meeting parts adapted to be clamped together, one of said parts being secured to the divider and the other to the platform-frame, a clamping-lever, a threaded eyebolt hinged to said lever, and a nut having oppositely-disposed trunnions, said trunnions engaging suitable bearings carried by one of the meeting parts, the threaded eyebolt engaging with said nut, and the clamping-lever engaging the other meeting part, whereby said two parts are clamped together.

In witness whereof I hereto affix my signature in presence of two witnesses.

EDWARD J. BIRKETT.

Witnesses:
JOHN GESSNER,
EARLE J. BRYDEN.